(12) United States Patent
Stocks et al.

(10) Patent No.: US 6,493,514 B1
(45) Date of Patent: Dec. 10, 2002

(54) METHOD AND APPARATUS FOR MAGNETIC COMMUNICATION VIA A PHOTOGRAPHIC FILMSTRIP

(75) Inventors: James E. Stocks, Rochester, NY (US); James W. Cannon, Penfield, NY (US); Christopher T. Mattson, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/946,099

(22) Filed: Sep. 4, 2001

(51) Int. Cl.$^7$ ................................................ G03B 17/24
(52) U.S. Cl. .......................................... 396/311; 396/319
(58) Field of Search ................................. 396/319, 311

(56) References Cited

U.S. PATENT DOCUMENTS

| | | |
|---|---|---|
| 4,876,697 A | 10/1989 | Whitfield |
| 4,912,467 A | 3/1990 | Whitfield et al. |
| 4,965,627 A | 10/1990 | Robison |
| 4,975,732 A | 12/1990 | Robison et al. |
| 4,977,419 A | 12/1990 | Wash et al. |
| 5,101,225 A | 3/1992 | Wash et al. |
| 5,130,745 A | 7/1992 | Cloutier et al. |
| 5,187,511 A | 2/1993 | Amano |
| 5,194,996 A | 3/1993 | Shores |
| 5,204,708 A | 4/1993 | Whitfield et al. |
| 5,229,810 A | 7/1993 | Cloutier et al. |
| 5,294,949 A | 3/1994 | Robison et al. |
| 5,335,029 A * | 8/1994 | Itoh et al. .................... 396/311 |
| 5,666,186 A | 9/1997 | Meyerhoefer et al. |
| 5,684,539 A | 11/1997 | Boyce et al. |
| 5,745,812 A * | 4/1998 | Taillie ......................... 396/319 |
| 6,321,040 B1 * | 11/2001 | Wess et al. .................. 396/311 |
| 6,344,873 B1 * | 2/2002 | Matsushima ................. 348/96 |

OTHER PUBLICATIONS

Fernando G. Silva & James E. Stocks, entitled Advanced Photo System IX Technology, Feb. 18–21, 1996, pp. 23–29. Paper given at The Society for Imaging Science and Technology's Ninth International Symposium on Photofinishing Technology in Las Vegas, Nevada.

* cited by examiner

Primary Examiner—David M. Gray
Assistant Examiner—Michelle Nguyen
(74) Attorney, Agent, or Firm—Roland R. Schindler, II

(57) ABSTRACT

A method is provided for recording metadata elements using a predetermined portion of a photographic filmstrip. The method comprising the steps of recording a primary data field including the entire set of data elements using a first share of the predetermined portion; and recording at least two secondary data fields on a second share of the predetermined portion; wherein at least one of the secondary data fields contains less than all of the metadata elements associated with an image.

49 Claims, 15 Drawing Sheets

METHOD AND APPARATUS FOR MAGNETIC COMMUNICATION VIA A PHOTOGRAPHIC FILMSTRIP

FIELD OF THE INVENTION

This invention relates generally to data communication using a photographic filmstrip. More particularly, the invention relates to a method and apparatus for recording data on a photographic filmstrip.

BACKGROUND OF THE INVENTION

It is recognized that images provide a superior means for exchanging information quickly and efficiently. However, there is a vast array of data that is associated with an image that can be used to increase the quality and utility of the image. For example, image processing algorithms exist that use data concerning the image such as camera settings, the distance between the camera and the subject, and/or whether a flash was discharged, to improve the appearance of an image. In addition, data concerning the image can be used to facilitate communication between a photographer and a photofinisher allowing the photographer to identify the number and type of prints of the image to be produced by a photofinisher. Further, the image itself becomes more useful to the user when the image is associated with data indicating the date, time, location and subject of the image, thus permitting the user to more quickly locate an image of interest. The image can also be made more useful to the consumer where the image is associated with multimedia data such as audio and other information.

Information of this type is known as metadata. Metadata is a term that is used to describe data that is associated with an image but may not necessarily visually appear in the image. The most convenient and effective way to gather and associate metadata with an image is to automatically associate metadata with the image at the time the image is captured and processed. For the full benefits of metadata to be realized, a method is needed to efficiently define metadata, to associate metadata with an image, and to later access and update the metadata.

A number of systems for accomplishing this result have been developed. Two of these systems have involved recording metadata magnetically on a magnetic recording layer of a photographic filmstrip and recording metadata optically on a photosensitive layer of a photographic filmstrip.

1. Magnetic Recording

In the early 1960s, an innovation in data communication for motion picture film was introduced. A thin layer of magnetic oxide, referred to as a DATAKODE Magnetic Control Surface, was coated across the entire back surface of a roll of motion picture film to provide the capability to magnetically record digital data on the film without interfering with normal photographic use of the film. The DATAKODE Magnetic Control Surface permitted recording of different types of digital data at different stages of production of a motion picture. Such data could range from camera lighting and filter data at the time of exposure, to printer exposure control information in the laboratory, to theatre automation control signals during exhibition. The DATAKODE Magnetic Control Surface was specifically applied to the recording of time code on motion picture films.

During the 1980s, film information exchange systems using dedicated magnetic tracks were developed for use in still photography. In these systems, a virtually transparent magnetic layer on the still photography filmstrip facilitates the magnetic recording of metadata in one or more longitudinal tracks of each film frame. With a virtually transparent magnetic layer, metadata recording may be done everywhere on the film including in the image area, so that metadata could be recorded with each frame of the film. In order to provide quick access to particular metadata at any stage of film use, related metadata is preferably grouped and recorded in specific predetermined tracks. In one of these systems for example, camera metadata, for example, is recorded in several dedicated longitudinal tracks along the filmstrip edges. The camera data, as well as other data, is preferably recorded in pulse position encoded form in order to be independent of film transport velocity.

Commonly assigned U.S. Pat. No. 5,204,708 describes an approach for recording metadata on a filmstrip using a simple, low cost camera, in which metadata is incorporated into metadata fields that are recorded in magnetic tracks on the film. This approach is used in the recently introduced Advanced Photographic System (APS). In APS, redundant copies of important metadata fields are recorded on a magnetic recording track associated with the image. Each track has a track start sentinel and a track end sentinel.

APS specifications limit the types of metadata that can be recorded to a predefined set of metadata elements. This set includes a minimum set of elements known as required metadata elements, and an optional set of metadata elements known as selectable metadata elements. Required metadata elements include, for example, the date and time that an image is captured and the format of the image. Selectable metadata includes, for example, a title that is associated with an image.

APS cameras that record metadata on film must record at least the required metadata in association with each image. Selectable metadata elements can be recorded where the camera that captures the image is adapted with features that generate the selectable metadata. The existing APS metadata recording architecture does not accommodate metadata types that are not within the pre-defined set of required and selectable metadata elements.

2. Optical Metadata Encoding Systems

Optical metadata encoding systems have been known for many years. Such systems have permitted a camera user or a camera to optically encode words, symbols, or other markings onto a photographic image. Typically, the principal use of such systems has been to provide user readable markings. In commonly assigned U.S. Pat. No. 5,666,186, an apparatus and method are shown for automatically extracting data from user readable markings on a filmstrip and for modifying the portion of the image containing the user data to improve the appearance of the image.

In another recent system for optically recording data in an image, it has been proposed to hide or embed information within an image using a technique known as watermarking. In this technique, metadata is embedded in the picture itself using a random phase carrier. The random phase carrier is designed so that the embedded metadata is encoded in the image in a visually transparent manner so that while the picture is modified, it does not appear to have been modified. This technique permits data to be optically encoded onto a filmstrip and later extracted from the processed image. In such optical metadata encoding systems, the requirement that the data is encoded in a visually transparent or visually pleasing manner can limit the amount of metadata that can be recorded in the image. Further, there exists a risk that optically encoded metadata can be lost or misinterpreted. Accordingly, a preferred architecture metadata is redundantly recorded in metadata fields that are optically recorded in the image.

As photographic technology continues to improve, new camera and image processing capabilities are introduced and existing capabilities are enhanced. Many of these capabilities require new forms of metadata that must be communicated using the filmstrip. Further, as existing camera features are enhanced, new and enlarged types of metadata are required. However, photographic film has a fixed capacity to store metadata recorded in either the magnetic or optical format. Thus, a need exists for a method for recording metadata that can accommodate an increased variety and volume of metadata using the same fixed amount of storage space on the film.

A further need exists for a method and camera to record new metadata elements in a manner that will permit existing metadata reading equipment to extract metadata from a filmstrip having new and enlarged types of metadata recorded on it.

SUMMARY OF THE INVENTION

A method is provided for recording metadata elements using a predetermined portion of a photographic filmstrip. The method comprises the steps of recording a primary data field including the entire set of data elements using a first share of the predetermined portion; and recording at least two secondary data fields on a second share of the predetermined portion; wherein at least one of the secondary data fields contains less than all of the metadata elements associated with an image.

According to another aspect of the present invention, a method for recording a variable number of metadata elements associated with an image using a predetermined portion of photographic filmstrip is provided. The method comprises the steps of forming a primary data field including the entire set of metadata elements for recording on a first share of the predetermined portion. A determination is made as to whether there is sufficient recording capacity to record all of the metadata elements in each of the secondary metadata fields on a second share of the predetermined portion. At least two secondary metadata fields including the entire set of metadata elements are recorded on the second share where it is determined that there is sufficient recording capacity and at least two secondary data fields are recorded in a second share of the predetermined portion and, wherein at least one of the secondary data fields contains less than all of the metadata elements associated with an image where it is determined that there is insufficient recording capacity.

In another aspect of the present invention, a camera is provided for communicating metadata elements associated with an image using a predetermined portion of a photographic filmstrip. The camera comprises a writing head for recording metadata elements onto a filmstrip. The camera further comprises a controller adapted to compose a pattern of more than two metadata fields including a primary metadata field having all of the metadata elements for recording on a first share of the predetermined portion and at least two secondary metadata fields for recording on a second share of the predetermined portion where at least one of the secondary metadata fields contains less than all of the metadata elements associated with an image, and further adapted to cause the writing head to record the primary and secondary metadata fields on the filmstrip.

In still another aspect of the present invention, a camera is provided for communicating metadata elements associated with an image using a predetermined portion of a photographic filmstrip. The camera comprises at least one camera input, wherein the number of metadata elements associated with the image varies in accordance with the status of the at least one camera input and a writing head for recording metadata elements onto a filmstrip. The camera further comprises a controller adapted to sense the status of the at least one camera input and to compose a pattern of more than two metadata fields including a primary data field including the all of the metadata elements associated with an image for recording on a first share of the predetermined portion; and further composing secondary metadata fields by determining whether there is sufficient recording capacity to record all of the metadata elements in each of the secondary metadata fields on a second share of the predetermined portion and composing at least two secondary metadata fields including the entire set of metadata elements in the second share where it is determined that there is sufficient recording capacity; and composing at least two secondary data fields in the unused share of the predetermined portion, wherein at least one of the secondary data fields contains less than all of the metadata elements associated with an image, where it is determined that there is insufficient recording capacity. The controller is further adapted to cause the writing head to record the composed primary and secondary metadata elements on the photographic filmstrip.

In another aspect of the present invention, a method for recording a set of metadata elements using a predetermined storage capacity of a memory associated with photographic filmstrip is provided. The method comprises the steps of recording a primary data field including the entire set of metadata elements using a first share of the predetermined capacity, recording at least two secondary metadata fields in a second share of the predetermined storage capacity wherein at least one of the secondary data fields contains less than all of the metadata elements.

In another aspect of the present invention, an apparatus for extracting metadata from a photographic filmstrip is provided. The apparatus comprises a read head engaging with the filmstrip and a controller operating the read head to read metadata recorded on the filmstrip, wherein the controller operates the read head to read each metadata field recorded on the filmstrip and to extract metadata from the metadata field having the greatest number of metadata elements.

BRIEF DESCRIPTION OF THE DRAWINGS

The foregoing and other features, aspects and advantages of the present invention will be readily understood from the following detailed description of a preferred embodiment when considered in conjunction with the accompanying drawings, in which:

FIG. 1a is a partial plan view of a photographic filmstrip having longitudinally extending recording tracks in a magnetic layer of the filmstrip;

FIG. 1b is a cross-section view of the filmstrip of FIG. 1a;

FIG. 4b illustrates a metadata recording architecture recorded on a filmstrip in accordance with the method of the embodiment of FIG. 4a.

FIG. 4c illustrates another metadata recording architecture recorded on a filmstrip in accordance with the method of the embodiment of FIG. 4a.

FIG. 5b illustrates a metadata recording architecture generated on a camera recording track in accordance with the method of FIG. 5a.

FIG. 5c illustrates a metadata recording architecture generated on a camera recording track in an alternative embodiment of the method of FIG. 5a.

FIG. 5d illustrates a metadata recording architecture generated on a camera recording track in an alternative embodiment of the method of FIG. 5a.

FIG. 6b illustrates a metadata recording architecture generated by the embodiment of the method of FIG. 6a.

FIG. 6c illustrates a metadata recording architecture generated by the embodiment of the method of FIG. 6a.

DETAILED DESCRIPTION OF THE INVENTION

Figure 1B:
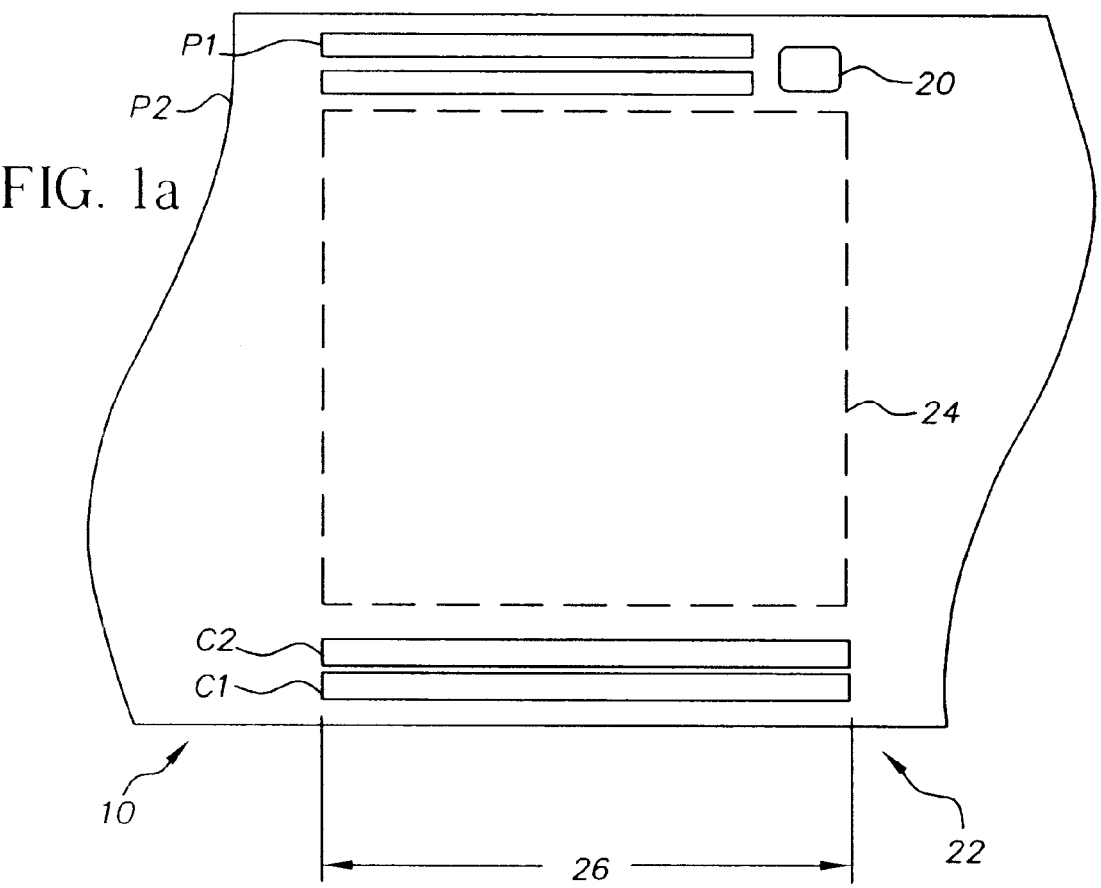
Figure 1B:
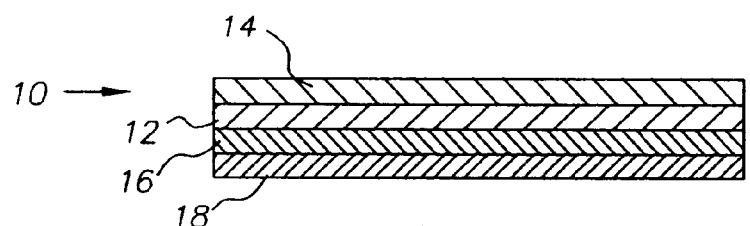

Metadata communication is effected in accordance with one embodiment of the method of the present invention by employing a filmstrip having a magnetic recording medium. FIGS. 1a and 1b show respectively a partial plan view and a cross-section of filmstrip 10 of color negative or other film of the type used in conjunction with this embodiment. Filmstrip 10 has a predefined size, e.g. 35 mm wide or 24 mm wide, and includes a base layer 12, a well-known photochemical layer 14 on one side of base layer 12, and a magnetic layer 16 on the other side. An antistatic and lubricating layer 18 overlies the magnetic layer 16. Filmstrip 10 includes perforations 20 at regular intervals.

Filmstrip 10 further includes a series of consecutive frames 22. Each frame 22 has an image frame 24 and a metadata frame 26. The magnetic layer 16 is made to be virtually transparent at least in that portion of the magnetic layer which is coextensive with image frame 24. This permits normal photofinishing of an exposed image in the image frame 24. Portions of magnetic layer 16 that are outside of image frame 24 need not be virtually transparent. Suitable materials for forming the magnetic layer 16 include a thin layer of iron oxide or other compositions with similar characteristics which are familiar to those skilled in this art. During magnetic recording, metadata is recorded in magnetic recording tracks C1, C2 and P1, P2. Recording tracks C1, C2 and P1, P2 are located outside of image frame 24. In APS, tracks C1 and C2 are typically used by a camera to record metadata. Similarly, tracks P1 and P2 are typically used during photofinishing or at other stages of use of filmstrip 10.

Figure 1C:
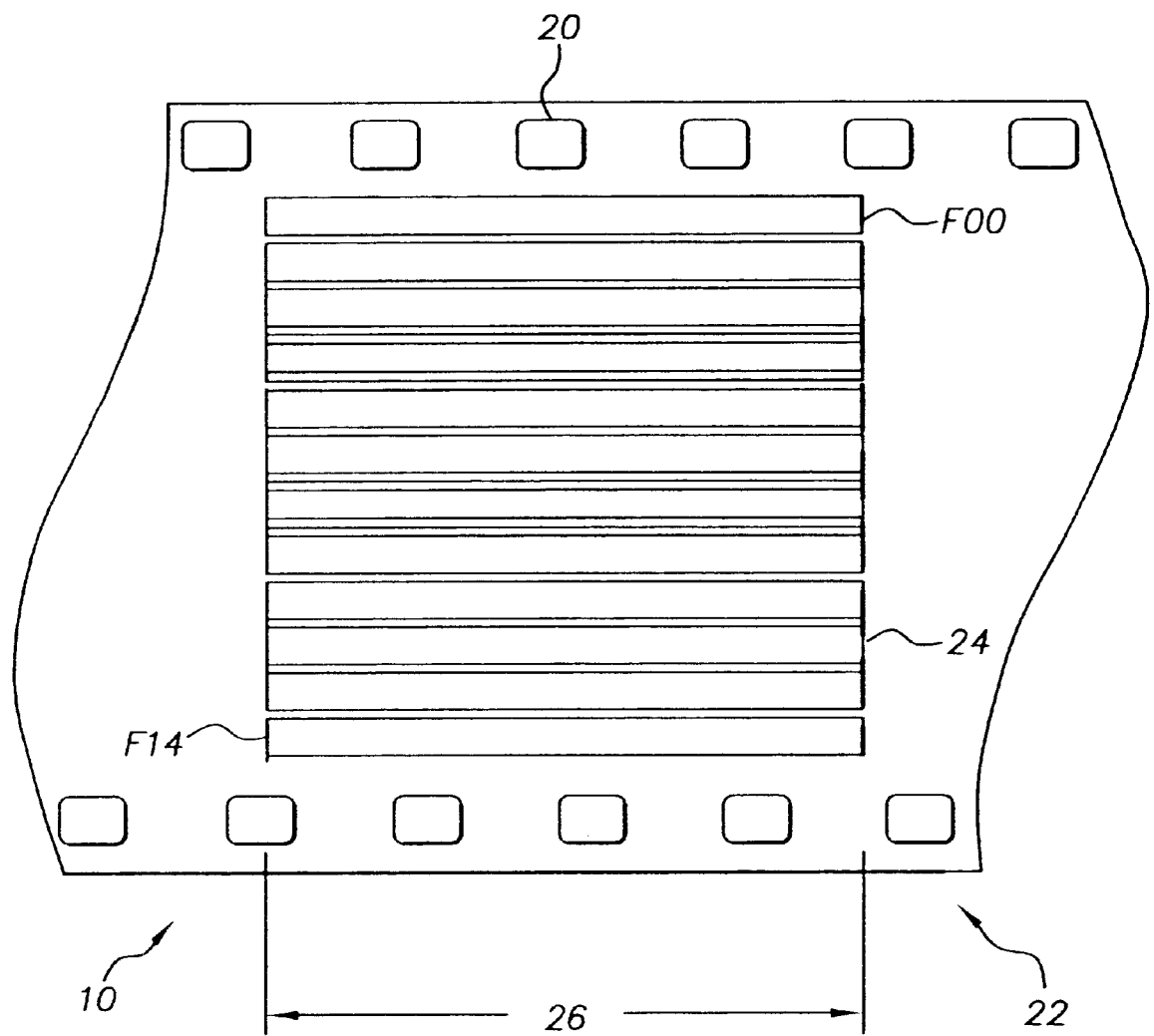
FIG. 1c is a partial plan view of another embodiment of a photographic filmstrip having longitudinally extending recording tracks in a magnetic layer of the filmstrip.

FIG. 1c shows an alternative filmstrip 10. Filmstrip 10 of FIG. 1c has a metadata frame 26 that is apportioned for receiving metadata recorded on a plurality of recording tracks F00–F14 within image frame 24 and used by a camera, photofinishing equipment and other equipment to communicate metadata in accordance with the present invention.

Figure 2:
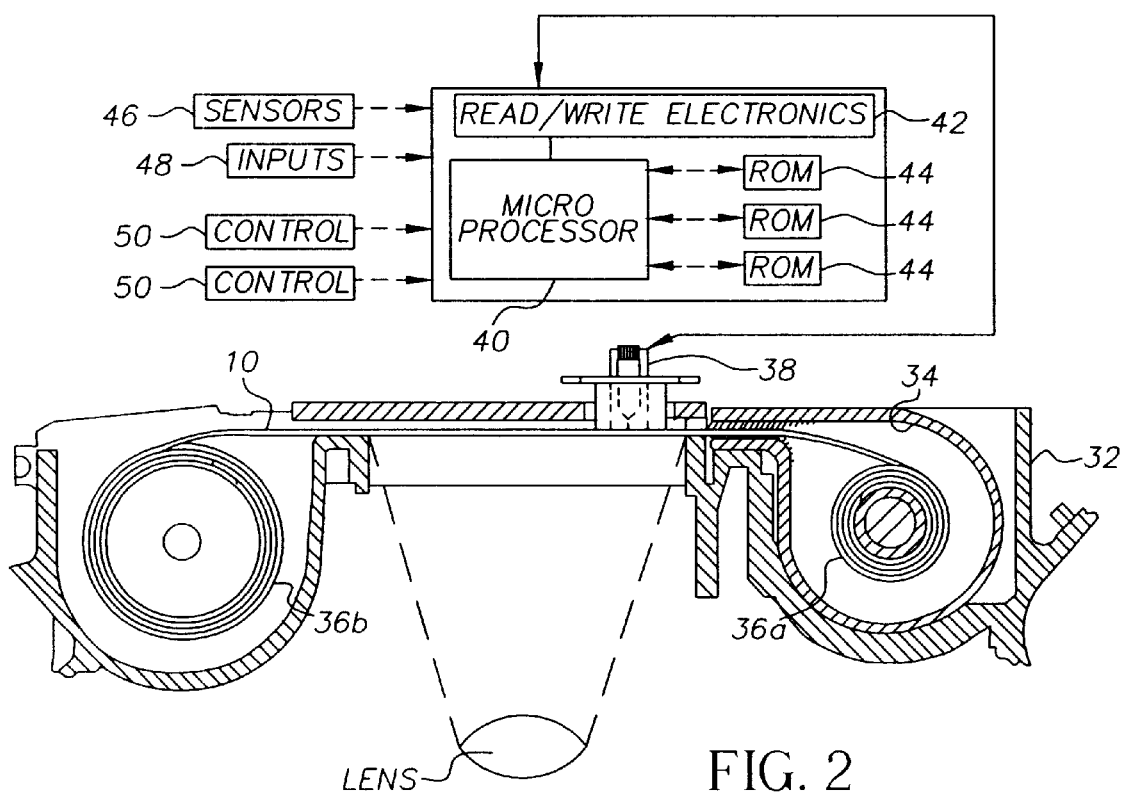
FIG. 2 illustrates a camera structure for magnetically recording metadata on a filmstrip.

Referring to FIG. 2, a camera 32 is shown that is adapted to magnetically record metadata onto filmstrip 10 between supply reel 36a and take-up reel 36b of a film cartridge or cassette 34 in which filmstrip 10 is stored. A take-up sprocket or metering pawl (not shown) conforming to the pitch of perforations 20 of filmstrip 10 facilitates film transport. Any conventional film transport mechanism can be used in camera 32. Camera 32 includes a write head 38 in close proximity with filmstrip 10. Read/write head 38 is adapted to record metadata on filmstrip 10. This can be done optically or magnetically. In the embodiment shown, write head 38 comprises a magnetic read/write head for recording metadata on magnetic layer 16 on the unsensitized side of the filmstrip 10. A microprocessor 40 controls magnetic data recording or playback by the head 38 through head electronics 42.

Microprocessor 40 may accept information to be magnetically recorded on the filmstrip 10 from sensors 46, other inputs 48 such as a personal computer, Personal Digital Assistant (PDA), Global Positioning System (GPS) locator, camera docking station, or other electronic device, and camera controls 50. Microprocessor 40 includes a read only memory 44 containing instructions for ensuring that metadata received from sensors 46, other inputs 48 and controls 50, are recorded in an appropriate track and in accordance with a preferred metadata recording method described hereinafter.

Microprocessor 40 sorts and buffers information in compliance with the instructions stored in the read only memory 44. One advantage of the longitudinal track format used in the prior art is that magnetic recording of metadata on filmstrip 10 may be performed by camera 32 using a relatively stationary write head 38. This is accomplished by buffering all of the metadata to be recorded in particular tracks such as C1, C2 and P1, P2 and then transmitting the metadata to head 38 just as filmstrip 10 is being wound to the next frame 22 or, alternatively, while filmstrip 10 is being rewound into film cassette 34.

It will be appreciated that, as a magnetic recording material, photographic film is relatively thick and not as compliant as typical magnetic tape. Further, the recording environment in many cameras is not controlled to the extent desirable and can suffer from higher error rates due to unsophisticated film transport systems, low power batteries, poor head-to-film interface and other physical disturbances. For example, film jitter in the longitudinal direction may produce pulse position errors. Spacing errors in the head contact direction due, for example, to dimples in the film or dirt can also corrupt data transfer. Filmstrip 10 may also wander in a lateral direction relative to the stationary recording head 38 causing a magnetic track such as C1 on filmstrip 10 to meander from its nominal trackpath. Such perturbations in the three orthogonal directions can introduce corruption errors in the transferred data. If a dropout (e.g. lost bit) occurs early in a track, decoding of all subsequent data in the track may be compromised, potentially resulting in significant data loss or difficult data reconstruction.

Figure 3:
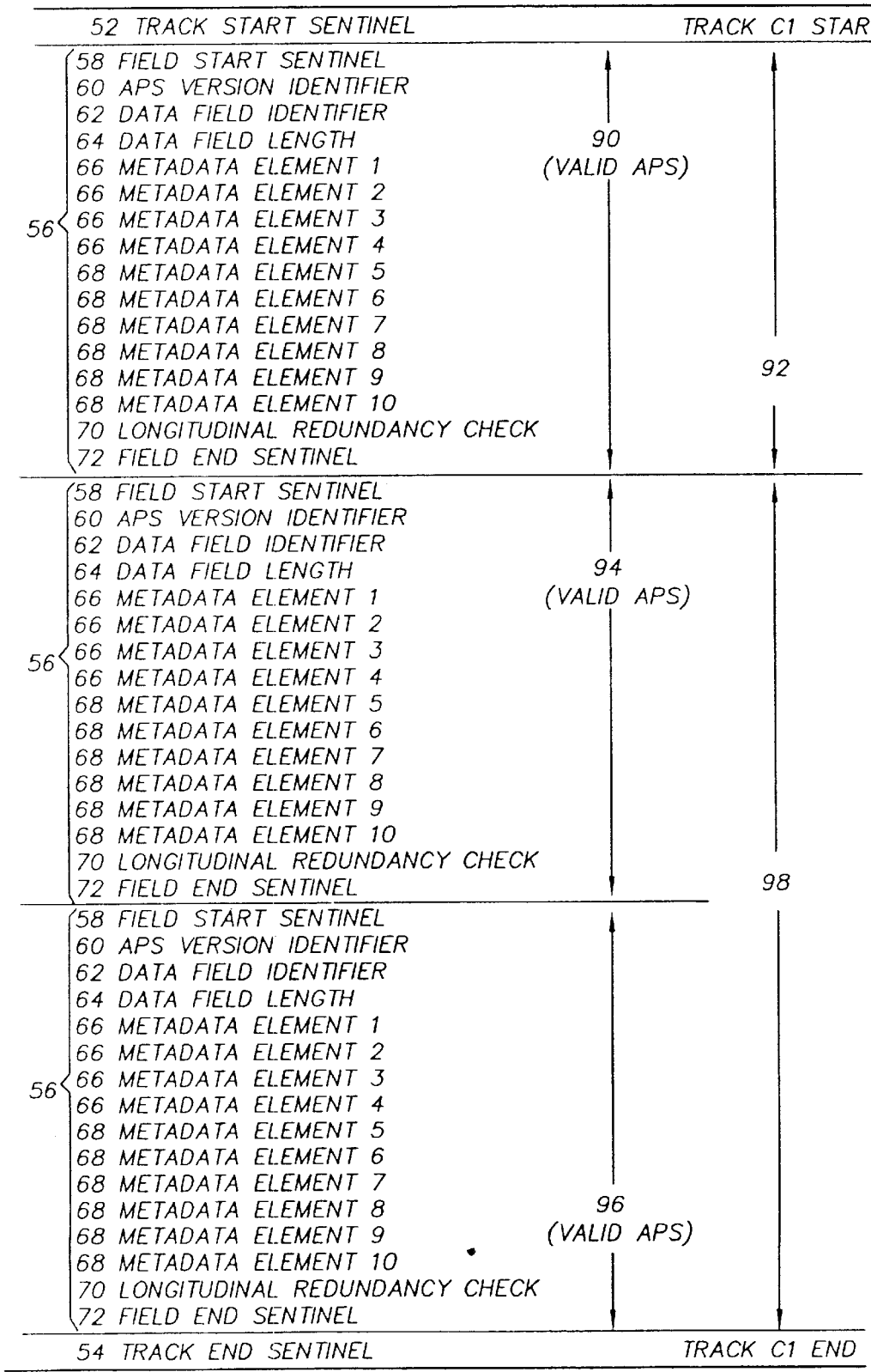
FIG. 3 illustrates a metadata recording architecture generated by a prior art recording method.

Accordingly, the data recording architecture of the prior art APS provides that the metadata associated with an image is packaged into metadata field structures and that, in most cases, multiple copies of each metadata field are recorded in association with each image. FIG. 3 illustrates the data architecture generated on a film by APS when recording metadata on magnetic layer 16 of filmstrip 10. In this system, metadata is recorded on tracks such as one of tracks C1, C2 and P1, P2. A track start sentinel 52 is recorded at the beginning of the chosen track and a track end sentinel 54 is recorded at the end of the track. Between the track start sentinel 52 and track end sentinel 54, three metadata fields 56 are recorded.

Metadata field 56 comprises a trappable field start sentinel 58, an APS version identifier 60, a field identifier 62, a field length identifier 64, required metadata elements 66, selectable metadata elements 68, a Longitudinal Redundancy Check (LRC) character 70 and a field end sentinel 72. The trappable field start sentinel 58 establishes a character boundary for the metadata elements 66 and 68 of the metadata field 56. Version identifier 60 identifies the APS version used to record metadata field 58. Data field identifier 62 identifies the nature of the metadata recorded in field 56 including the content and structure of the metadata field 56. Field length identifier 64 provides an indication of the length of metadata field 56. The trappable nature of field start sentinel 58 provides a data valid signal or pulse output which can be used as a start boundary for parsing the metadata field 56 into individual required metadata elements 66 and selectable metadata elements 68.

The LRC character 70 provides a preferred mechanism for error checking and correction within metadata field 56. The use and implementation of such LRC characters is well known to those versed in this art. Details regarding longitudinal redundancy checking can be found, for example, in PRACTICAL ERROR CORRECTION DESIGN FOR ENGINEERS (Second Edition) 1988 by Neal Glover and Trent Dudley, published by Data Systems Technology, Corp., pages 4–6. In the event that an error is detected in a metadata field 56, the two remaining metadata fields 56 on the track are available to be read.

Track start sentinel 52 and track end sentinel 54 separate metadata fields 56 that are associated with one image from metadata fields that are associated with another image.

Figure 4A:
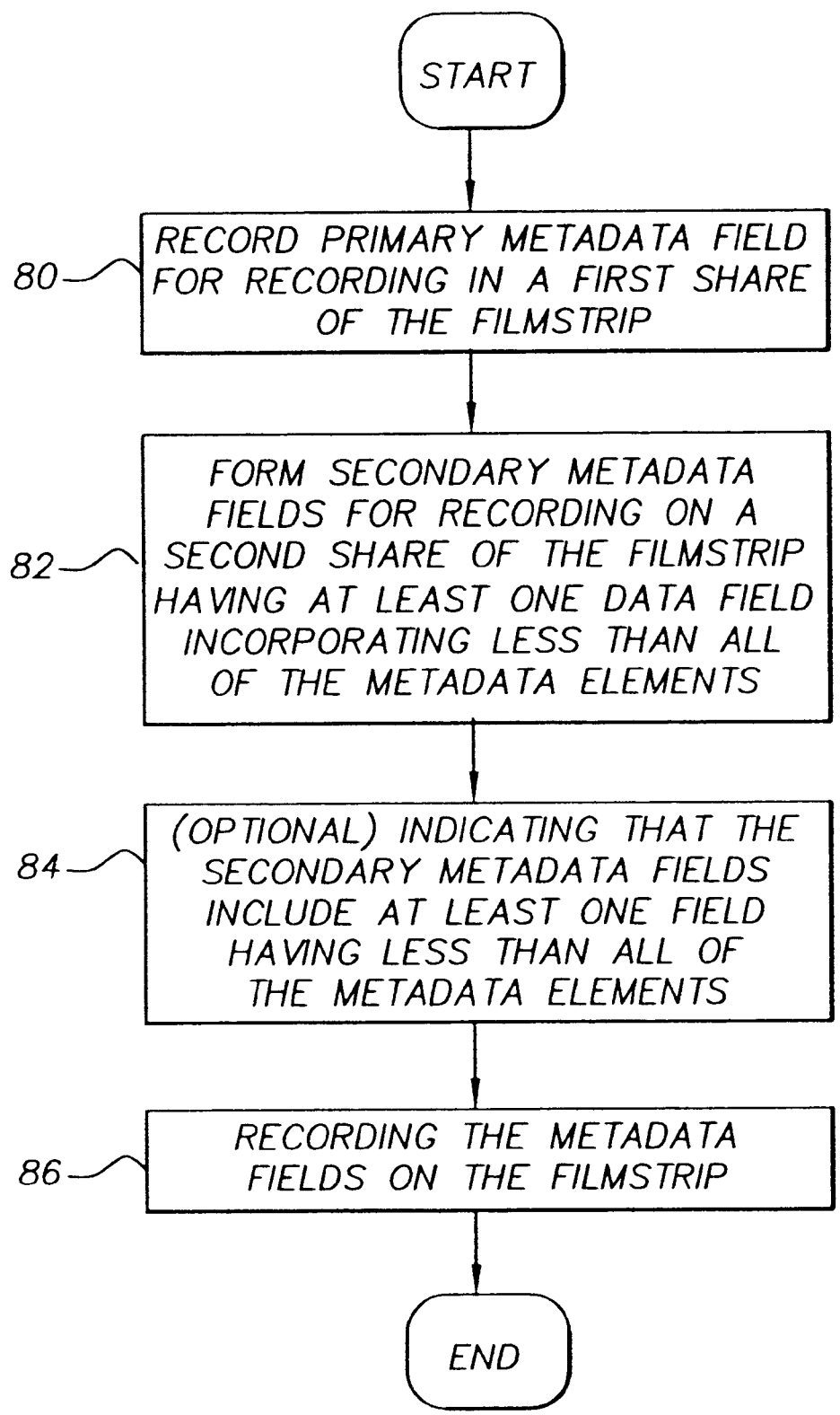
FIG. 4a is a flow chart depicting a preferred embodiment of the method of the present invention.
Figure 4B:
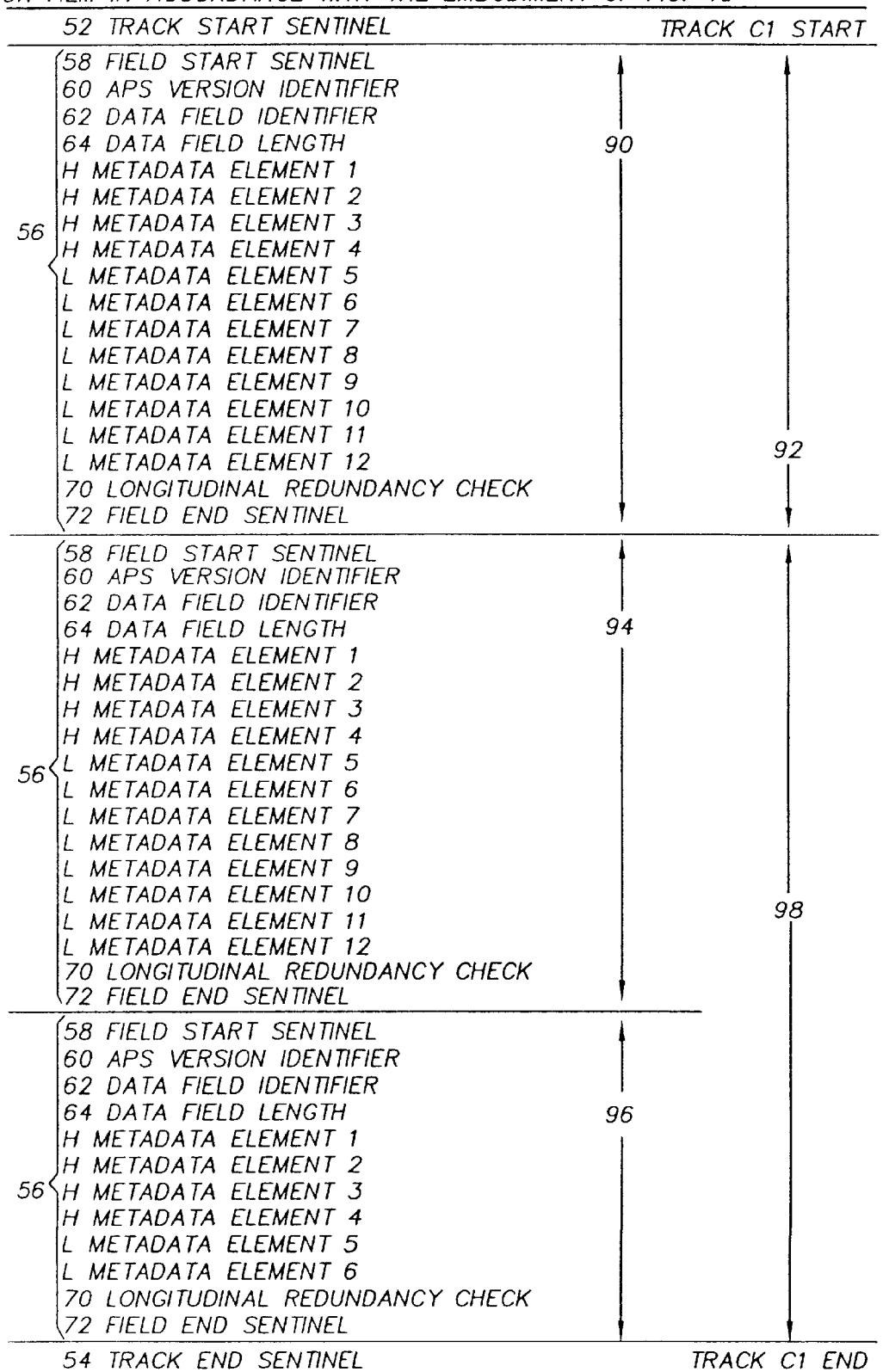

FIG. 4a shows a flow chart depicting an embodiment of the method of the present invention to be performed by a camera 32 of the present invention. FIG. 4b depicts the metadata recording architecture generated on a camera recording track such as track C1 on filmstrip 10 by camera 32 in accordance with the method of FIG. 4a. The first step in the embodiment of FIG. 4a is form primary metadata field step 80.

In step 80, a primary metadata field 90, that includes all the metadata elements associated with an image, is formed. When recorded on a track such as track C1, primary metadata field 90 occupies a first share 92 of track C1. In order to accommodate metadata from new and enhanced camera features primary metadata field 10 may occupy a relatively large portion of the metadata recording capacity of track C1. In such a case, there is insufficient magnetic recording capacity to record multiple copies of primary metadata field 90 on the second share 98 of track C1.

Accordingly, in step 82, secondary metadata fields 94 and 96 are formed for recording on the second share 98 of track C1. The secondary metadata fields 94 and 96 comprise at least one metadata field 56 having an abridged copy of primary metadata field 90. The secondary metadata fields 94 and 96 are abridged generally to the extent necessary to permit the recording of both secondary metadata fields 94 and 96 in second share 98 of track C1. In a preferred embodiment of the present invention, metadata is prioritized and, secondary metadata fields 94 and 96 are abridged in a manner which omits low priority metadata elements from one metadata field, for example, secondary metadata field 96, before omitting any metadata elements from metadata field 94.

In the example shown in FIG. 4b, track C1 has a magnetic recording capacity sufficient to record three metadata fields 56 each having ten metadata elements. However, in this example, metadata field 90 comprises 12 metadata elements and therefore, first share 92 of track C1 occupies a portion of the magnetic recording capacity of track C1 that does not permit the remaining metadata fields 94 and 96 to record all of the 12 metadata elements associated with the image. As will be seen in this example, secondary metadata field 96 has been abridged. In this regard, secondary metadata field 96 contains only six metadata elements. However, secondary metadata field 92 contains all of the 12 metadata elements associated with the image. Accordingly, in this example, higher priority metadata elements (H) receive triple redundant recording treatment whereas lower priority metadata elements (L) receive only double redundant recording treatment.

Figure 4C:
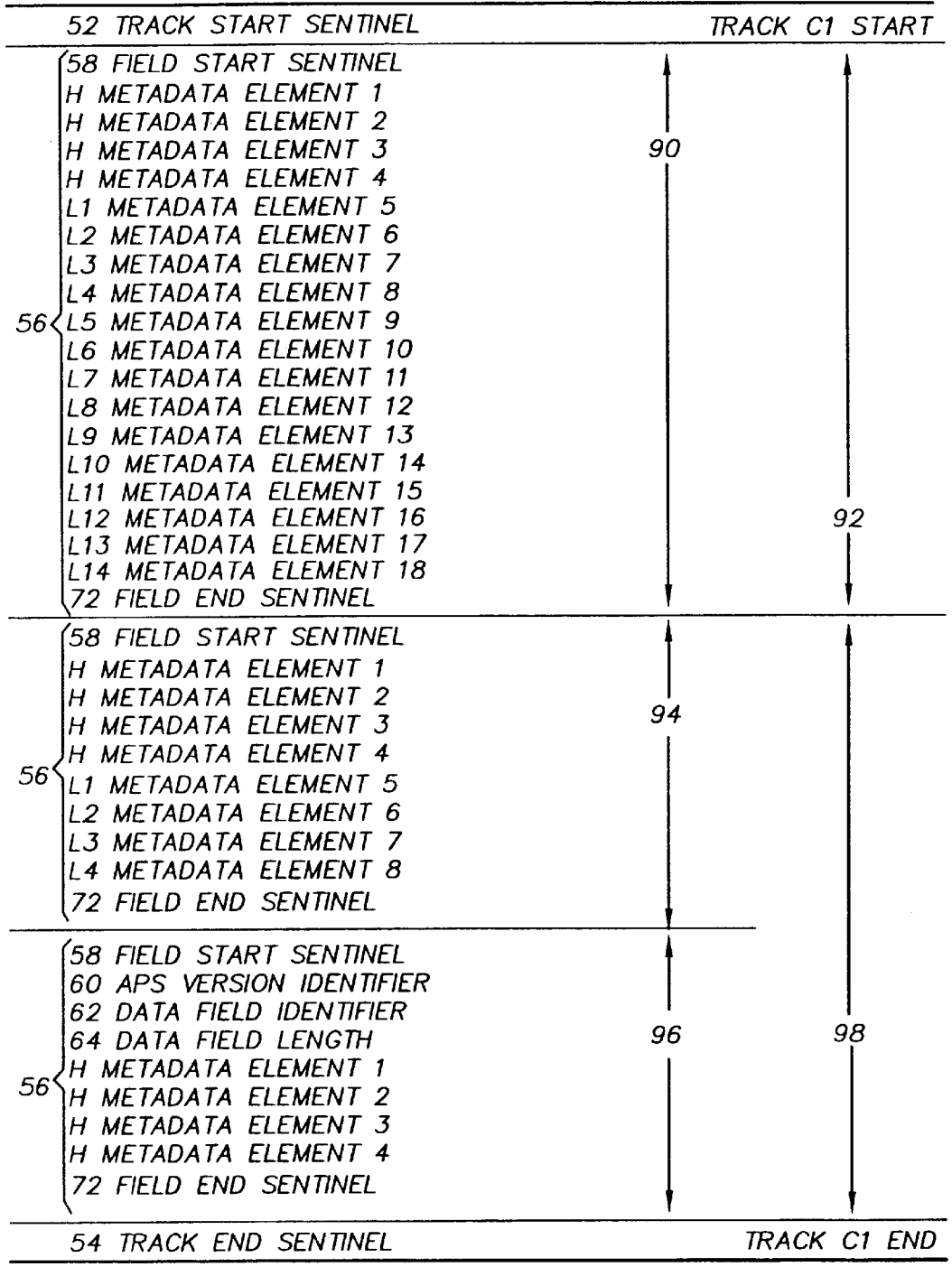

In a preferred embodiment of the present invention, each of the secondary metadata fields 94 and 96 contain at least a minimum number of highest priority metadata elements (H). As is shown in FIG. 4c, in circumstances where primary metadata field 90 contains a relatively large number of metadata elements, it may become necessary to abridge more than one of secondary metadata fields 94 and 96. Here too, metadata elements are omitted from secondary metadata fields 94 and 96 on the basis of their priority. Where this occurs, triple redundant recording of highest priority metadata elements (H) is preserved and, double redundant recording of lower priority metadata elements (L), is also preserved to the extent that sufficient recording capacity is available.

After the primary and secondary metadata fields 94 and 96 have been formed, the optional step 84 of generating an indication is performed In this step, a signal is generated to allow a metadata reader to detect that certain of the metadata fields have been abridged. There are many ways to generate this indication. In this regard, a track start sentinel 52, a field start sentinel 58, a field end sentinel 72 or a track end sentinel 54 can be adapted for providing this indication. Further, additional characters can be recorded on track C1 in order to alert reading equipment that abridged metadata fields are recorded on track C1. This indication causes a metadata reading device to read each of metadata fields 90, 94, and 96 in order to extract the greatest number of metadata elements from the metadata fields recorded on the track.

In step 86, metadata fields 90, 92, and 94 and optional indicators are recorded on track C1.

Figure 5A:
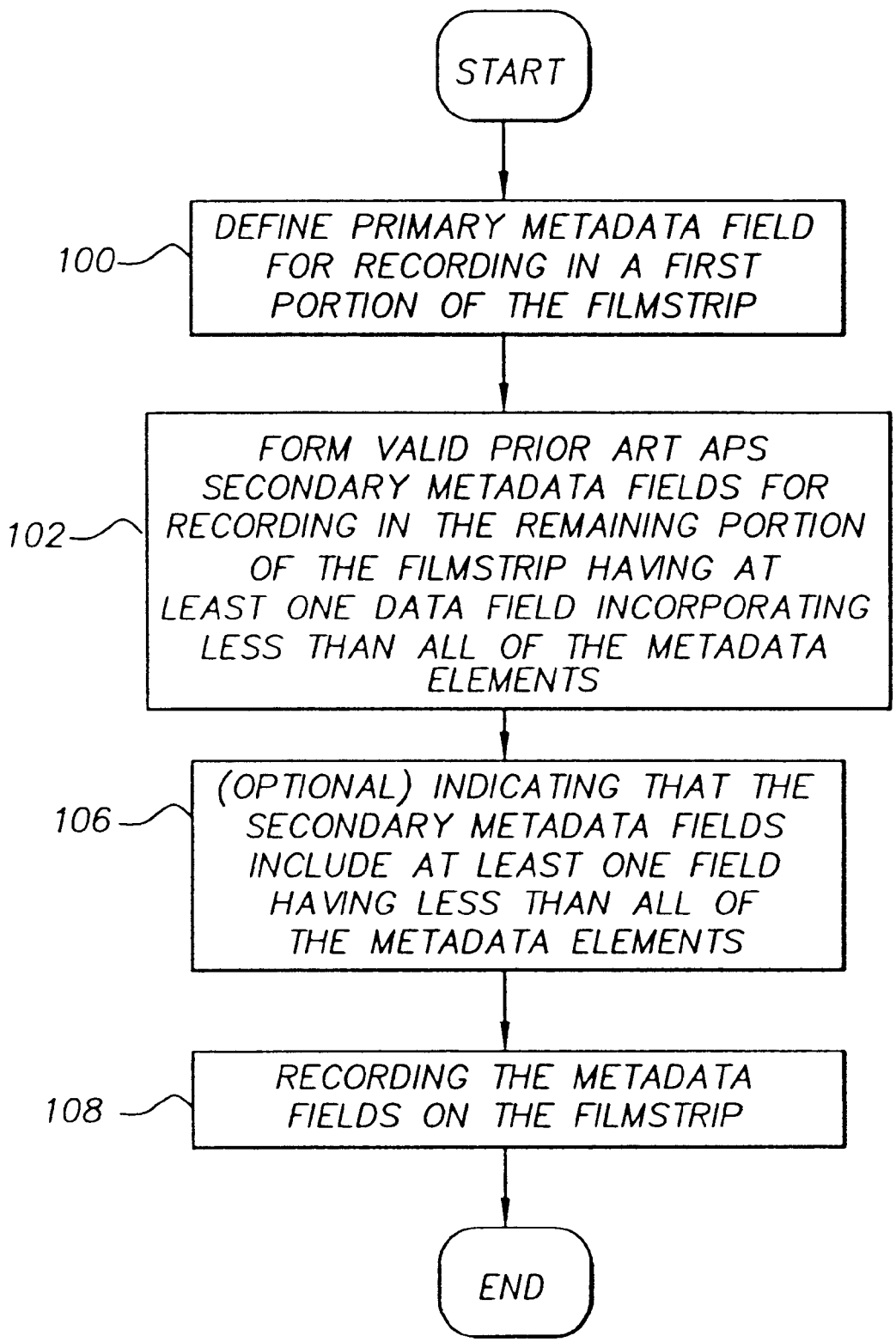
FIG. 5a is a flow chart depicting another embodiment of the method of the present invention.
Figure 5B:
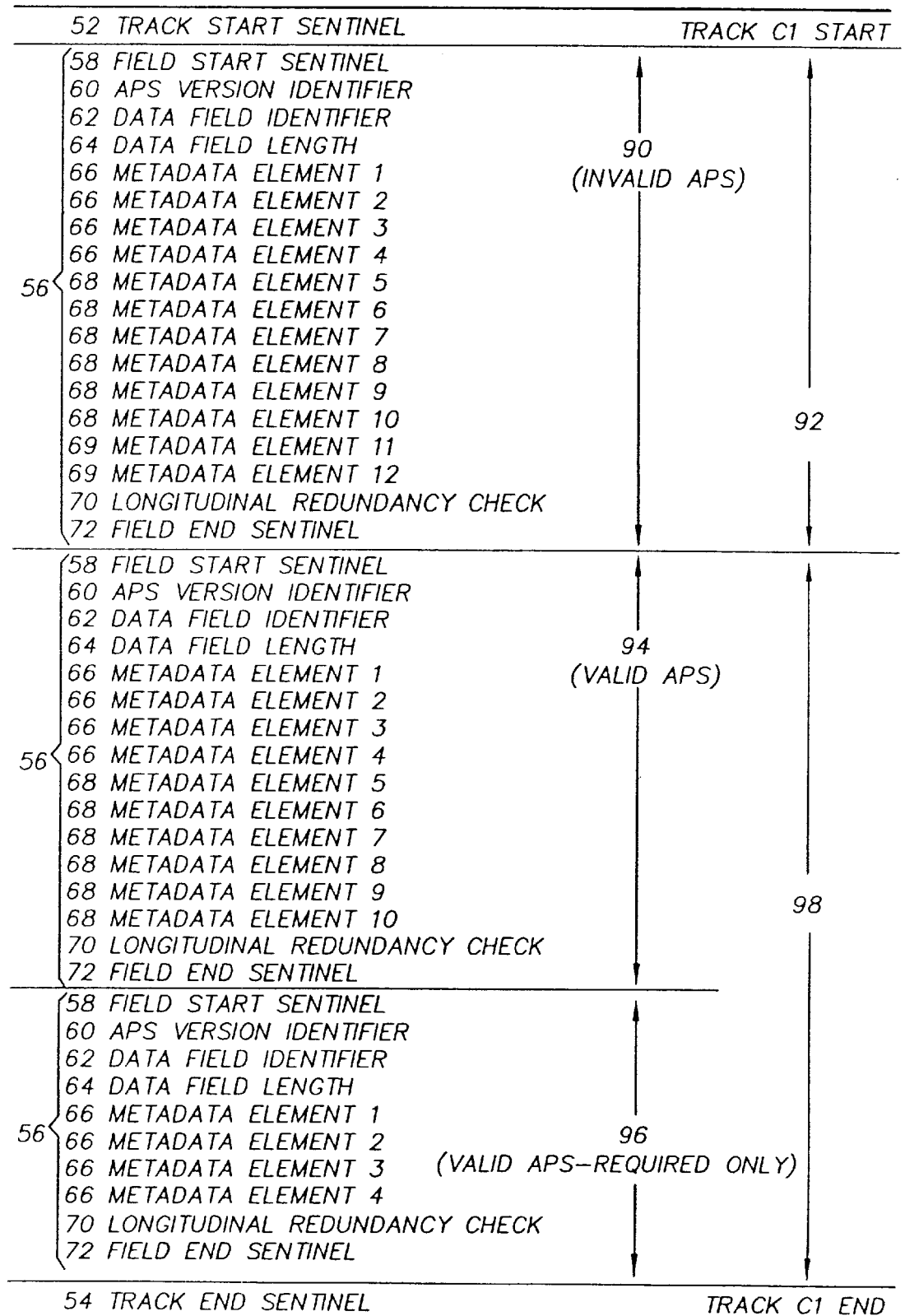

FIG. 5a shows an embodiment of the method of the present invention adapted for recording metadata on a track of a photographic filmstrip 10 in a manner that can be read by APS reading equipment of the prior art. FIG. 5b depicts the metadata recording architecture generated on a camera recording track such as track C1 on filmstrip 10 by camera 32 practicing method of FIG. 5a.

The first step in the embodiment of FIG. 5a is the form primary metadata field, step 100. In step 100, primary metadata field 90 that includes all of the required metadata 66 and selectable metadata 68 associated with an image, is formed. In this embodiment, primary metadata field 90 also includes metadata types and sizes that are not included in the predefined set of APS required metadata 68. This additional metadata is referred to herein as enhanced metadata 69. The presence of the enhanced metadata 69 in primary metadata field 90 causes metadata field 90 to be an invalid APS field. When recorded on filmstrip 10, primary metadata field 90 occupies first share 92 of the magnetic recording capacity of camera recording track C1. In the next step 102, valid prior art APS secondary data fields 94 and 96 are formed for recording in the second share 98 of the magnetic recording capacity of track C1. In this embodiment, the secondary metadata fields 94 and 96 are defined to meet two conditions: 1) secondary metadata fields 94 and 96 must be recordable in the second share 98 of the magnetic recording capacity of track C1 and 2) secondary metadata fields 94 and 96 must comprise valid APS metadata fields.

In this embodiment of the present invention, each secondary metadata field 94 and 96 is structured in a manner which can be described by a data field identifier 62 of APS. Thus, in this embodiment, secondary data field 94 and secondary data field 96 do not contain any extended metadata elements 69. Further, each of the secondary metadata fields 94 and 96 must be sized so that they can at least contain required metadata elements 66.

An example of a recording architecture generated by this embodiment of the present invention is shown in FIG. 5b. As seen in FIG. 5b, primary metadata field 90 comprises extended metadata elements 69. The presence of extended metadata elements 69 in primary metadata field 90 causes primary metadata field 90 to be an invalid APS metadata field. Accordingly, secondary metadata fields 94 and 96 are defined in a manner that can be read by prior art metadata reading equipment. Thus, each of secondary metadata fields 94 and 96 will contain required metadata 66 and, when possible, selectable metadata 68. Further, each of secondary metadata fields 94 and 96 comprise a valid metadata field under existing APS.

Figure 5C:
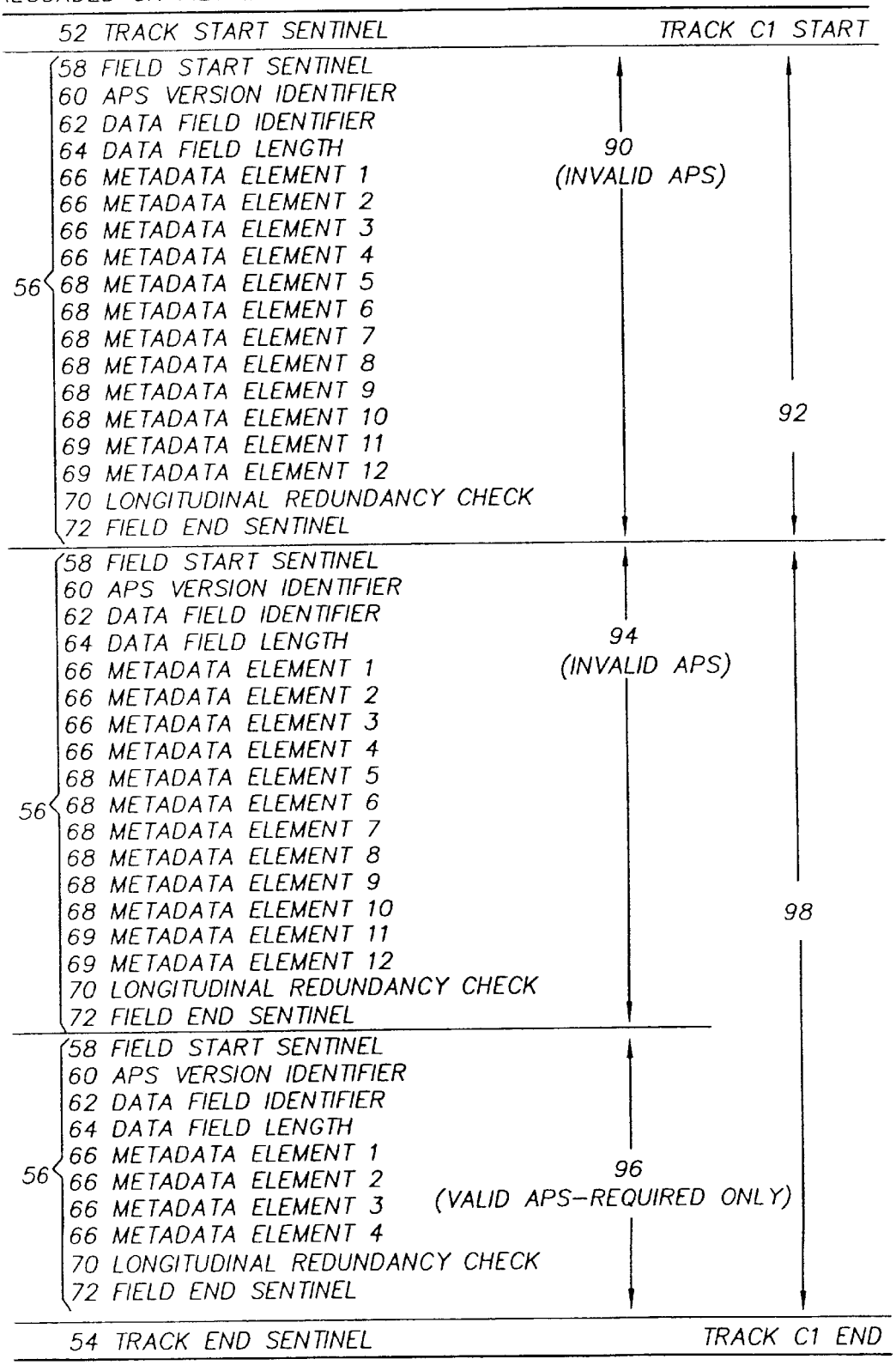

In the example shown in FIG. 5c, metadata field 94 includes all of the required metadata elements 66 and selectable metadata elements 68 associated with an image. However, there is insufficient magnetic recording capacity in second share 98 of track C1 to permit secondary metadata field 96 to include all of the required metadata elements 66 and selectable metadata elements 68. Accordingly, in this embodiment, secondary metadata field 96 comprises only required metadata elements 66. In this regard, data field identifier 62 and data field length identifier 64 of secondary metadata field 96, are modified to reflect that secondary metadata field 96 contains only required metadata.

Figure 5D:
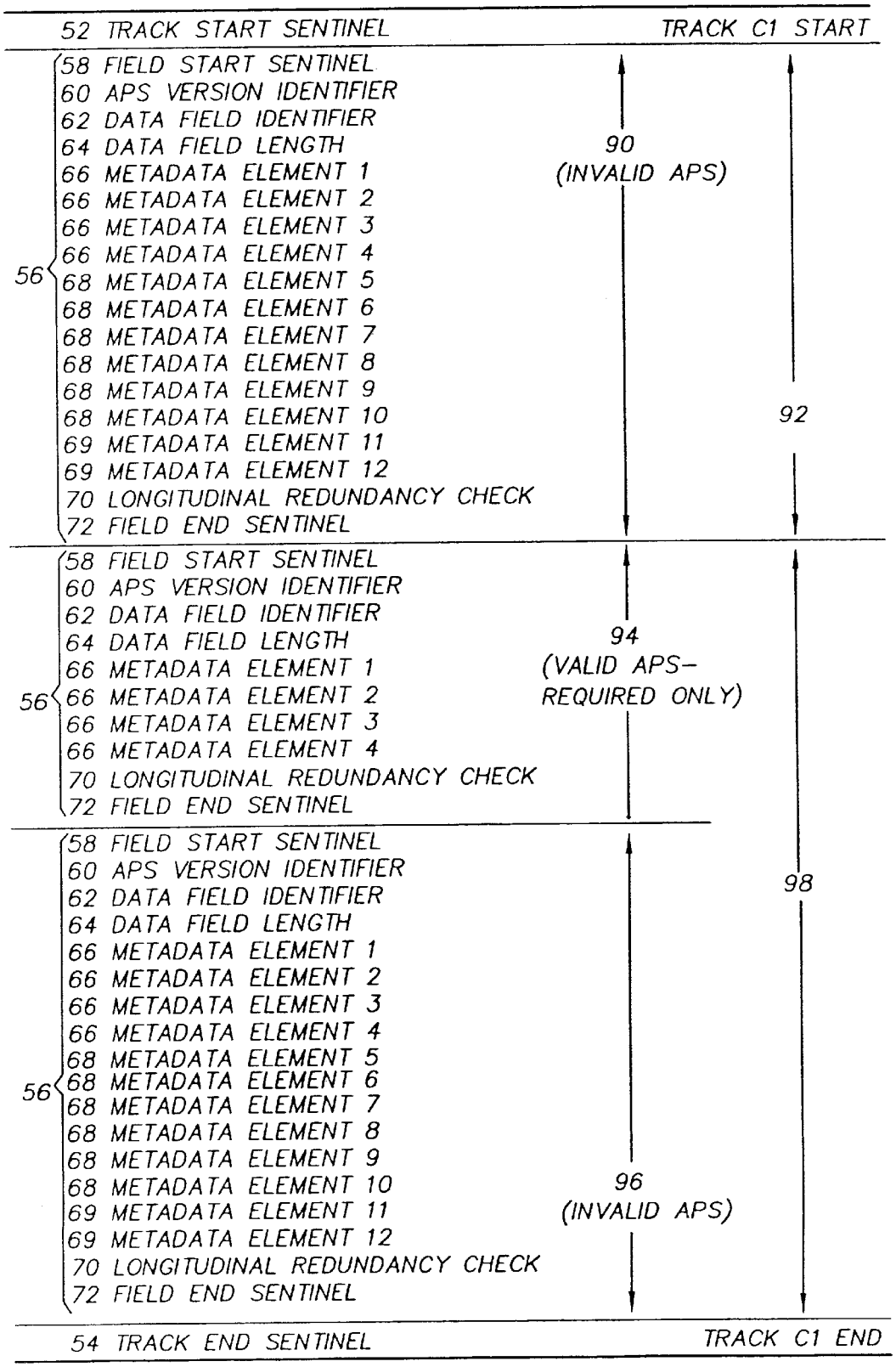

Returning now to FIG. 5a, the next step in the method of the present invention is the optional step 106 of indicating that secondary metadata fields 94 and 96 include at least one metadata field having less than all the metadata elements. In step 106, the metadata field structure is modified to indicate that at least one of the metadata fields contains less than all of the metadata. This indication can comprise a specialized version of track start sentinel 52, track end sentinel 58, field start sentinel 56, APS version identifier 60, data field identifier 62, data field length identifier 64, longitudinal redundancy check 70, or field end sentinel 92. Additionally, other identifiers can be used. For example, the arrangement of the metadata fields 90, 94 and 96 can be modified to suggest that at least one of metadata fields 90, 94 and 96 contains less than all of the metadata associated with the image. In this regard, a metadata reader can be adapted to detect this indicator and to read all of the metadata fields associated with an image to determine which of the metadata fields contains the most metadata. An example of this embodiment is shown in FIG. 5d. In this embodiment, primary metadata field 90 and secondary metadata field 96 contain the same metadata elements whereas secondary metadata field 94 contains only required metadata elements. This arrangement of short and long metadata fields acts as an indication that certain metadata fields contain more metadata than others.

The final step in the method of FIG. 5a is step 108 of recording the metadata fields on filmstrip 10. As has been described herein, step 108 can be performed by magnetically recording the metadata fields 90, 94 and 96 on a magnetic track. Alternatively, metadata fields 90, 94 and 96 can be optically encoded for recording on the filmstrip 10. In this regard, the metadata fields 90, 94 and 96 can be recorded in a pattern, (in a track wise fashion) which is readable in a manner that is similar to that used to read magnetic tracks. Alternatively, a non-track arrangement can be used provided that the encoded data is optically extractable from the image.

It will be appreciated that in certain cameras, the user may selectably elect to use certain camera features in association with the capture of one image and other camera features in association with another image. To the extent that the feature set varies from image to image, the metadata associated with each image may vary. To maximize the metadata storage capacity of a filmstrip 10, it is useful to adapt the metadata recording pattern to omit recording metadata elements that are associated with unused camera features.

Figure 6A:
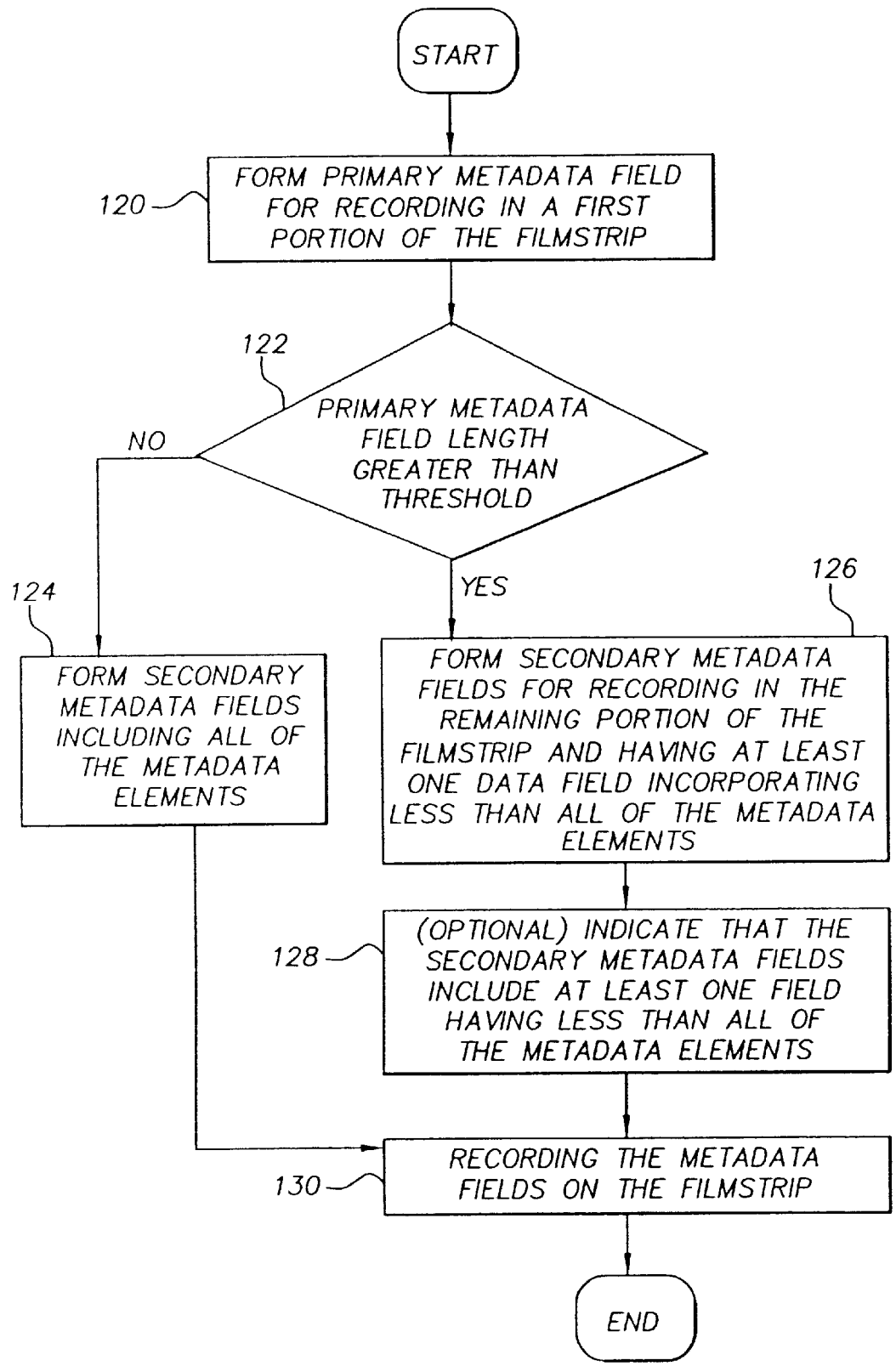
FIG. 6a is a flow chart depicting another embodiment of the method of the present invention.

FIG. 6a shows an alternative embodiment of the method of the present invention for recording metadata on filmstrip 10 in a manner that responsively adapts the metadata recording architecture to respond to the feature set selected by the user. The first step of this method is to form primary metadata field step 120. The primary metadata field 90 contains all the metadata elements associated with an image. Because the features used in association with the capture of an image may vary from image to image, the metadata elements contained in primary metadata field 90 can vary from image to image. Thus, the field length of primary metadata field 90 is not known until the image is captured. Accordingly, in step 120 of the method of FIG. 6a the field length of primary metadata field 90 is greater than a predetermined threshold. In the embodiment of FIG. 6a, the threshold is established so that when primary metadata field 90 is shorter than the threshold, there is sufficient metadata recording capacity to record all of the metadata associated with the image at a desired redundancy in the second share. (step 122) When this is the case, the method proceeds to step 124 and secondary metadata fields 94 and 96 are formatted and comprise copies of primary data field 90. Where it is determined in step 122 that the length of primary metadata field 90 is greater than the threshold, the method of FIG. 6a proceeds to step 126. In step 126, secondary metadata fields are formed for recording in the remaining portion of the recording capacity of the filmstrip 10 associated with the image. At least one of secondary metadata fields 94 and 96 incorporates less than all of the metadata elements. In this regard, step 126 is performed in a manner consistent with the embodiments described with respect to FIG. 4a or 5a above.

In the embodiment of FIG. 6a, the optional step, 128, indicates the secondary metadata fields include at least one field having less than all of the metadata elements, can be performed. This can be done consistent with the principles described with respect to the similar step in the embodiments of FIGS. 4a and 5a.

Figure 6B:
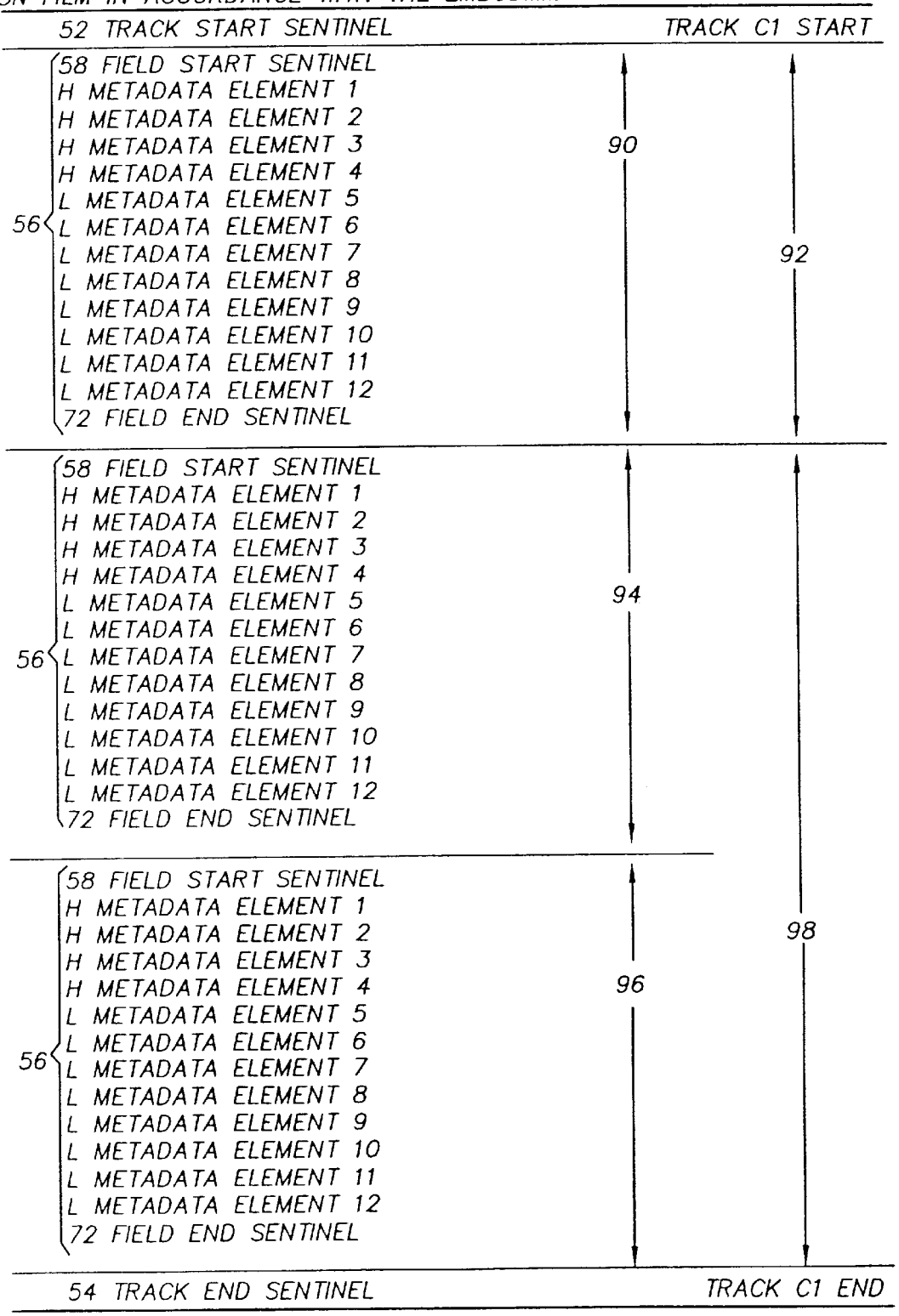
Figure 6C:
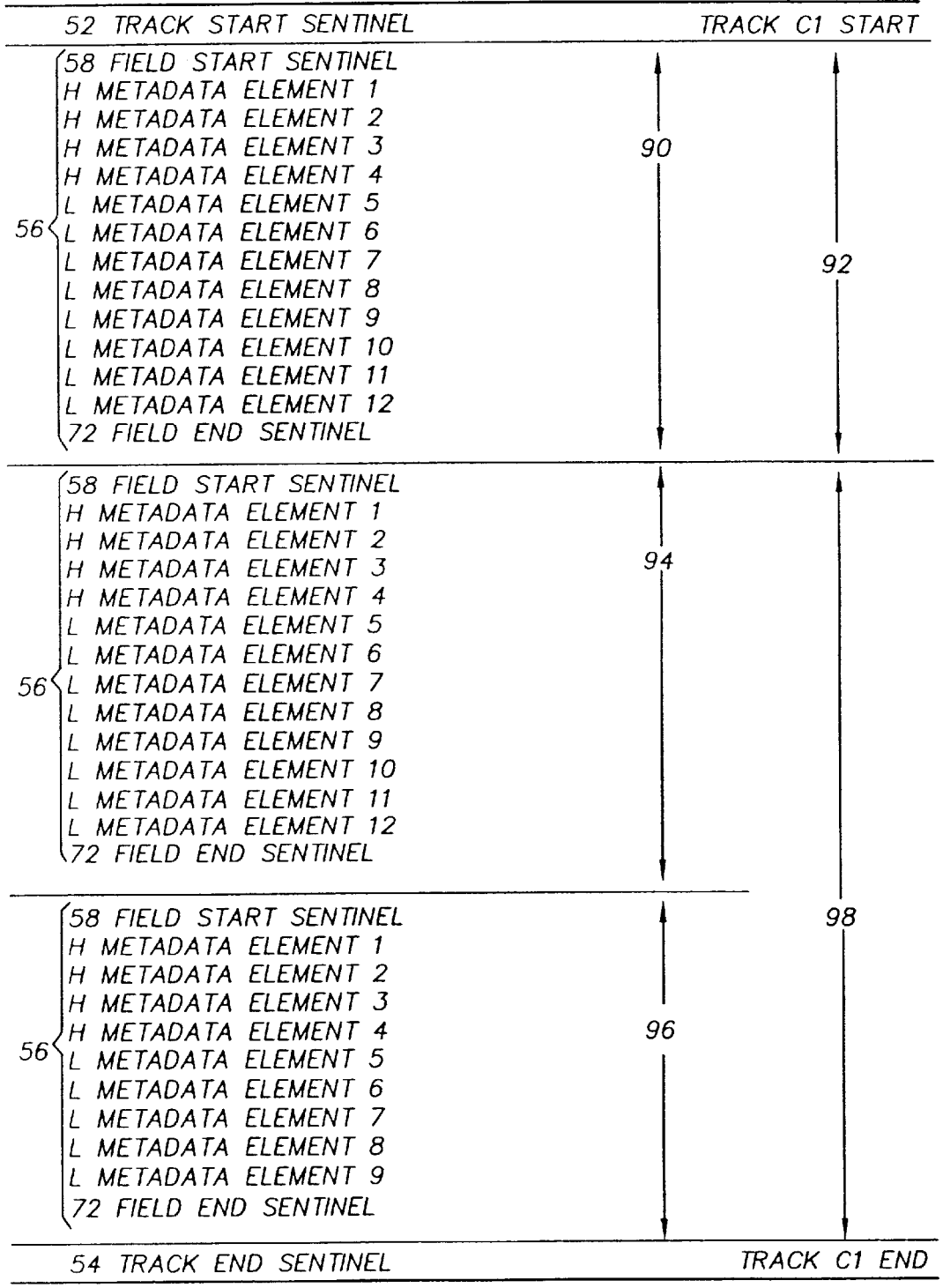

Finally, in step 130, the primary metadata field 90 and secondary metadata fields 94 and 96 are recorded on a filmstrip 10. This can be done optically or magnetically. FIG. 6b shows metadata recording architecture recording in accordance with step 124 of the method of FIG. 6a. As can be observed from this embodiment, each of secondary metadata fields 94 and 96 is an identical copy of primary metadata field 10. FIG. 6c, however, shows a recording architecture of the present invention generated by the performance of step 126. As is seen in the data recording architecture of FIG. 6c, the method of 124 has been performed, and, secondary metadata field 96 contains an abridged set of metadata elements produced so that both secondary metadata field 94 and secondary metadata field 96 can be recorded in the magnetic recording second share 98 of magnetic recording capacity of track C1.

In the embodiments of the method described herein above, a priority system has been applied to each of the metadata elements, and those metadata fields having lower priority have been removed from the secondary metadata elements 94 and 96 before higher priority metadata elements have been removed. It is, however, conceivable that other methods can be used for selecting the metadata elements to be excluded from the metadata fields 94 and 96 can be used.

For example, a method of the present invention may first exclude certain large metadata elements which occupy a greater portion of the magnetic or optical recording capacity of the filmstrip 10 in order to make recording capacity available for recording a greater number of smaller metadata elements that require less recording capacity. Further, it will be appreciated that the priority assigned to individual elements can be modified based upon a user indication of the type of photograph that the user is attempting to capture. For example, where the user of camera 32 intends to capture a portrait image, a user may so designate this to the camera, and camera 32 may selectively record such metadata as is useful for improving the appearance of a portrait image in preference to metadata information such as GPS locator information. It will be appreciated that other selection criteria can be used.

Figure 7:
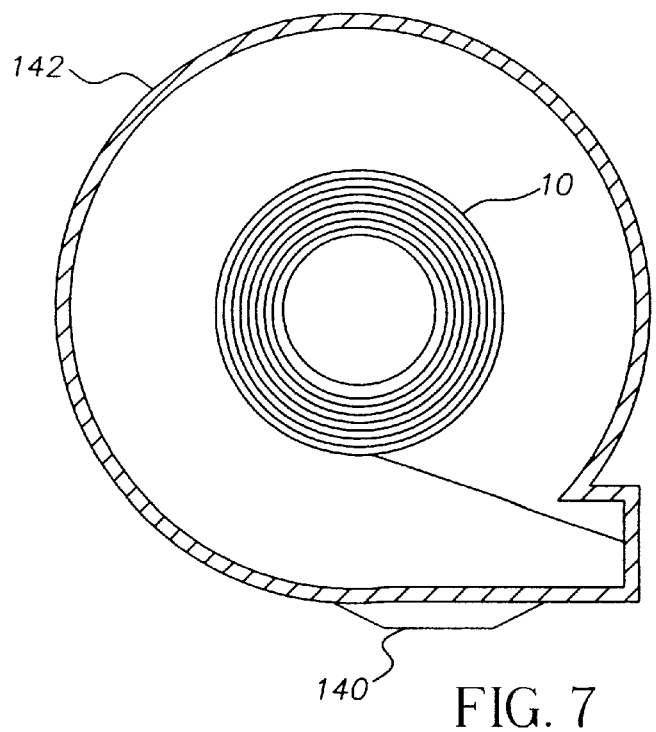
FIG. 7 illustrates a partial cross-section view of a film canister having a semiconductor memory for storing metadata in accordance with the method of the present invention.

It will be appreciated that metadata can be associated with a filmstrip in ways that do not involve optical or magnetically recording the metadata on the filmstrip itself. For example, a digital or other electronic memory 140 can be associated with the filmstrip 10 to store the metadata. As is shown in FIG. 7, the electronic memory 140 can comprise a semiconductor non-volatile memory fixed to a film canister 142. The method of the present invention can be used to exchange metadata in such semiconductor memory as well as other types of memory associated with a filmstrip 10.

Figure 8:
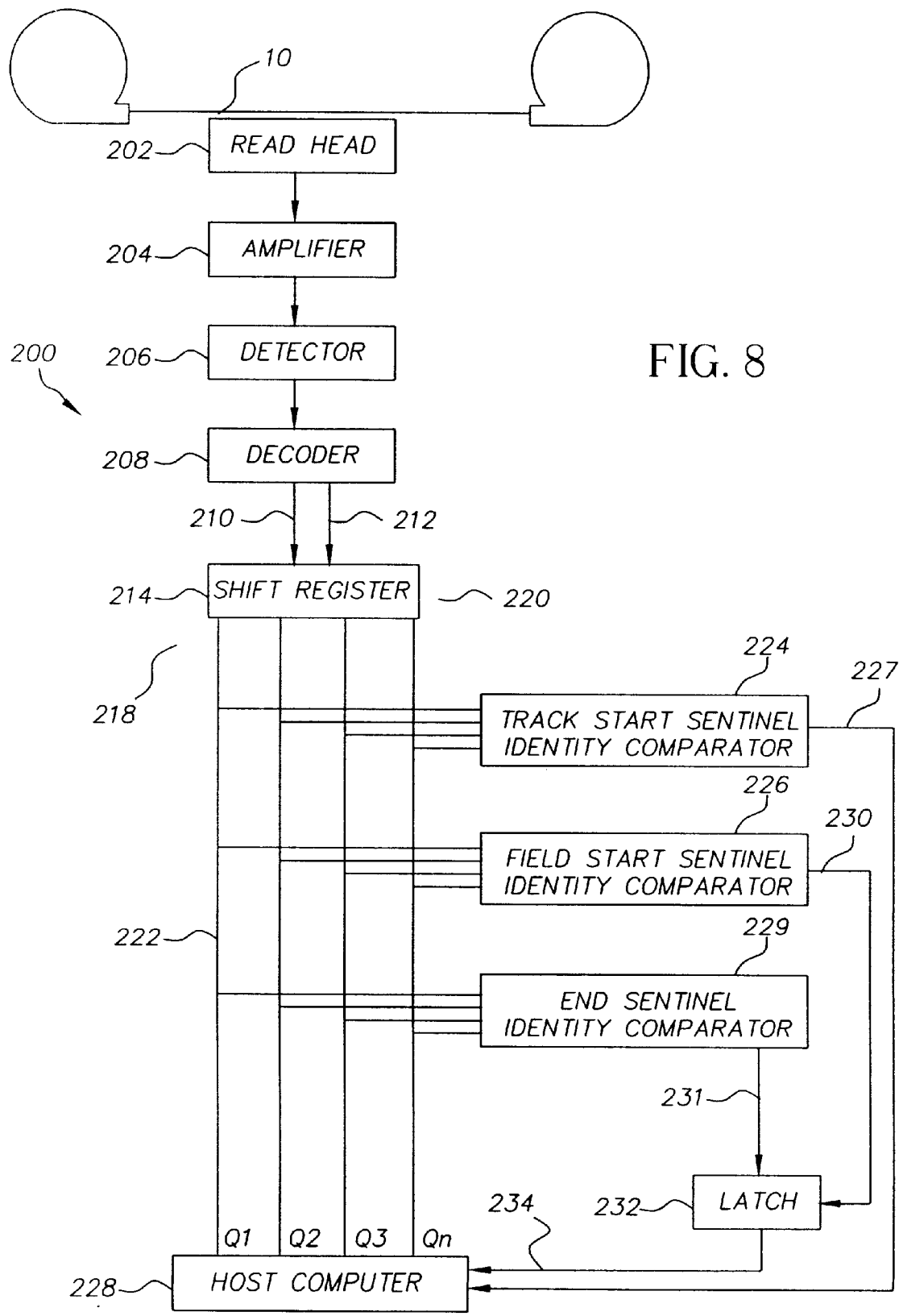
FIG. 8 is a schematic diagram of read out apparatus for reading metadata fields formatted in accordance with the principles of the present invention.

FIG. 8 illustrates a read out apparatus 200 for use with the metadata recording architecture of the present invention. Read out apparatus 200 includes a read head 202. Read head 202 may comprise a magnetic or optical reading head. Read head 202 is adapted to read metadata recorded on the filmstrip 10 or otherwise recorded in association with filmstrip 10 such as occurs when semiconductor or other memory is used. Where read head 202 comprises a magnetic read head, read head 202 reads magnetic bits along a magnetic track of the filmstrip 10 and generates an output signal. The output signal from read head 202 is amplified by amplifier 204 and provided to a detector 206. Detector 206 provides an indication of each positive pulse and negative pulse signal in the magnetic recording track. Decoder 208 receives output signals from detector 206 and generates a serial bit stream from the signals. Suitable exemplary decoding circuitry is described in commonly assigned U.S. Pat. Nos. 4,876,697; 4,964,139; and 4,965,575 which are hereby incorporated by reference. The serial bit stream from decoder 208 is provided along lines 210 and 212 to a shift register 214. In addition to the serial bit stream, shift register 214 also receives a transport direction signal 218 and a shift clock signal 220. In response to these inputs, shift register 214, in conventional fashion, transforms the serial bit stream into parallel output form sequentially over every 2n consecutive bits (Q1–Q2n) of the stream on parallel bit lines 222 (where "n" represents the bit length of a character). Track start sentinel identity comparator 224 compares every 2n consecutive bit sequence (Q1–Q2n) as described above received on lines 222 with a bit pattern of track start sentinel 52. When a 2n consecutive bit sequence is identical to the bit pattern of the track start sentinel 52, a pulse output is provided along line 227 to host computer 228. Host computer 228 uses the pulse output from track sentinel identity comparator 224 to parse the serial bit stream of the magnetic track received along line 218 into n-bit characters.

Once metadata track start sentinel 52 is detected, a field start sentinel identity comparator 226 and an end sentinel identity comparator 229 are used. Like the track start sentinel identity comparator 224, field start sentinel identity comparator 226 and end sentinel identity comparator 229 are provided with every 2n consecutive bit sequence of the serial bit stream from shift register 214 via lines 222. When field start sentinel identity comparator 226 detects a match with the programmed bit pattern of a field start sentinel, a field start sentinel occurrence signal is provided along line 230. When end sentinel identify comparator 229 detects a field end sentinel it transmits a signal along lines 231 to latch 232. Latch 232 provides an output signal along line 234 to host computer 228 which is valid (low), as shown, during the time interval between the detection of the field start sentinel and detection of the end sentinel.

In accordance with the principles of the present invention, host computer 228 is adapted to recognize metadata fields 56 recorded in accordance with the recording architecture described herein. In particular, host computer 228 distinguishes metadata fields 56 recorded in accordance with the architecture described herein from metadata recorded in accordance with the APS architecture of the prior art or other architecture of the prior art.

Read out apparatus 200 can be adapted to search for indicators that a metadata track contains abridged metadata fields 92 and 96. In particular, field comparators 224 and 226 can be adapted to detect indicators that are encoded in the track start sentinel 56 or field start sentinel 58. Further, host computer 228 can be adapted to search for other indicators. Where an indicator is detected, host computer 228 will attempt to extract data from primary data field 90 in preference to other metadata fields. Alternatively, read out apparatus 200 can have a host computer 228 that is adapted to simply read every metadata field associated with an image and to extract from these metadata fields the largest number of metadata elements that can be extracted from a valid metadata field 56.

Where metadata is optically encoded on a filmstrip 10, read head 38 scans either predefined tracks on filmstrip 10 or the entire image frame 24 to capture possible optically encoded metadata. Decoder 208 then examines the output of the optical read head 38 to identify a track start sentinel 52. Track start sentinel 52 is then identified and decoded as described above. While the term track has been used to describe the optical and magnetic recording path on a filmstrip 10, it is recognized that it is possible to record optical or magnetic metadata in non-linear patterns.

It will be understood that while the present invention has been shown and described as associated with a metadata recording scheme in which only three metadata fields 56 are recorded in connection with each magnetic or optical recording track, the present invention is adaptable and can be operated using a recording system that employs more than three metadata fields.

The invention has been described in detail with particular reference to certain preferred embodiments thereof, but it will be understood that variations and modifications can be effected within the spirit and scope of the invention.

PARTS LIST 10 filmstrip
12 base
14 photochemical layers
16 magnetic layer
18 antistatic lubricating layer
20 perforations
22 frames
24 image area
26 metadata frame
32 camera
34 cassette
38 write head
36a supply reel
36b take up reel
40 microprocessor
42 head electronics
44 camera memory
46 camera sensors
48 camera inputs
50 camera controls
52 track start sentinel
54 track end sentinel
56 metadata field
58 field start sentinel
60 APS version identifier
62 data field identifier
64 field length identifier
66 required metadata
68 selectable metadata
69 extended metadata elements
70 longitudinal redundancy check character
72 field end sentinel
80 form primary metadata field step
82 form secondary metadata field step
84 form indicator step
86 record metadata field step
90 primary metadata field
92 first share
94 secondary data field
96 secondary data field
98 second position of magnetic recording capacity
100 form primary metadata field step
102 form valid prior art APS secondary field step
106 form indication step
108 record metadata field step
120 form primary metadata field step
122 primary field length comparison step
124 form secondary metadata field step
126 form secondary metadata field step
128 form indicator step
130 record metadata field step
140 Electronic Memory
142 Film Canister
200 read out apparatus
202 read head
204 amplifier
206 detector
208 decoder
210 lines
212 lines
214 shift register
218 transport directional signal
220 shift clock signal
222 lines
224 track start sentinel identity comparator
226 field start sentinel identity comparator
227 line
228 host computer
229 end sentinel identity comparator
230 data bus
232 latch
234 line
608 decoder
H high priority metadata
L low priority metadata
C1, C2 magnetic recording tracks
P1, P2 magnetic recording tracks
F00–F14 magnetic recording tracks

What is claimed:

1. A method for recording a set of metadata elements using a predetermined portion of photographic filmstrip, the method comprising the steps of:
   recording a primary data field including the entire set of data elements using a first share of the predetermined portion;
   recording at least two secondary data fields in a second share of the predetermined portion;
   wherein at least one of the secondary data fields contains less than all of the metadata elements associated with an image.

2. The method of claim 1 further comprising the step of recording an indication that at least one of the metadata fields contains less than all of the metadata elements.

3. The method of claim 2 wherein the indication identifies metadata fields having less than all of the metadata elements.

4. The method of claim 1 wherein each of the secondary metadata fields comprises a valid APS metadata field.

5. The method of claim 4 further comprising the step of recording an indication that at least one of the metadata fields contains less than all of the metadata elements.

6. The method of claim 5 wherein the indication identifies metadata fields having less than all of the metadata elements.

7. The method of claim 1 wherein the metadata elements are prioritized and wherein lower priority metadata elements are omitted from the at least one of the secondary metadata fields containing less than all of the metadata elements associated with an image before higher priority metadata elements are omitted.

8. The method of claim 7 further comprising the step of recording an indication that at least one of the metadata fields contains less than all of the metadata elements.

9. The method of claim 8 wherein the indication identifies metadata fields having less than all of the metadata elements.

10. A method for recording a set of metadata elements using a predetermined portion of photographic filmstrip, the method comprising the steps of:
   recording a primary data field including the entire set of metadata elements for recording on a first share of the predetermined portion;
   determining whether there is sufficient recording capacity to record all of the metadata elements in each of at least two secondary metadata fields on a second share of the predetermined portion;
   recording at least two secondary metadata fields including the entire set of metadata elements in the second share of the predetermined portion where it is determined that there is sufficient recording capacity; and
   recording at least two secondary data fields in the second share of the predetermined portion wherein at least one of the secondary data fields contains less than all of the metadata elements associated with an image, where it is determined that there is insufficient recording capacity.

11. The method of claim 10 further comprising the step of recording an indication that at least one of the metadata fields contains less than all of the metadata elements.

12. The method of claim 11 wherein the indication identifies metadata fields having less than all of the metadata elements.

13. The method of claim 10 wherein each of the secondary metadata fields comprises a valid APS metadata field.

14. The method of claim 13 further comprising the step of recording an indication that at least one of the metadata fields contains less than all of the metadata elements.

15. The method of claim 14 wherein the indication identifies metadata fields having less than all of the metadata elements.

16. The method of claim 10 wherein the metadata elements are prioritized and wherein lower priority metadata elements are omitted from the at least one of the secondary metadata fields containing less than all of the metadata elements associated with an image before higher priority metadata elements are omitted.

17. The method of claim 16 further comprising the step of recording an indication that at least one of the metadata fields contains less than all of the metadata elements.

18. The method of claim 17 wherein the indication identifies metadata fields having less than all of the metadata elements.

19. A camera for communicating metadata elements using a predetermined portion of a photographic filmstrip, the camera comprising;
    a writing head for recording metadata elements onto a filmstrip; and,
    a controller adapted to compose a pattern of more than two metadata fields including a primary metadata field having all of the metadata elements associated with an image for recording on a first share of the predetermined portion and composing at least two secondary metadata fields for recording on a second share of the predetermined portion where at least one of the secondary metadata fields contains less than all of the metadata elements associated with an image, and further adapted to cause the writing head to record the primary and secondary metadata fields on the filmstrip.

20. The camera of claim 19 wherein the controller generates an indication that at least one of the metadata fields contains less than all of the metadata elements and causes the writing head to record the indication on the filmstrip.

21. The camera of claim 20 wherein the indication identifies metadata fields having less than all of the metadata elements.

22. The camera of claim 19 wherein each of the secondary metadata fields comprises a valid APS metadata field.

23. The camera of claim 22 wherein the controller generates an indication that at least one of the metadata fields contains less than all of the metadata elements and causes the writing head to record the indication in each metadata field that is recorded on the filmstrip.

24. The camera of claim 23 wherein the indication identifies metadata fields having less than all of the metadata elements.

25. The camera of claim 19 wherein the metadata elements are prioritized and wherein lower priority metadata elements are omitted from the at least one of the secondary metadata fields containing less than all of the metadata elements associated with an image before higher priority metadata elements are omitted.

26. The camera of claim 25 wherein the controller generates an indication that at least one of the metadata fields contains less than all of the metadata elements and causes the writing head to record the indication on the filmstrip.

27. The camera of claim 26 wherein the indication identifies metadata fields having less than all of the metadata elements.

28. A camera for communicating metadata elements using a predetermined portion of a photographic filmstrip, the camera comprising:
    at least one camera input, wherein the number of metadata elements associated with the image varies in accordance with the status of the at least one camera input;
    a writing head for recording metadata elements onto a filmstrip; and,
    a controller adapted to sense the status of the at least one camera input and to compose a pattern of more than two metadata fields including a primary data field including the entire set of metadata elements for recording on a first share of the predetermined portion; and further to compose secondary metadata fields by determining whether there is sufficient recording capacity to record all of the metadata elements associated with an image on each of the secondary metadata fields on a second share of the predetermined portion and with the controller composing at least two secondary metadata fields including all of the metadata associated with an image in the second share where it is determined that there is sufficient recording capacity; and with the controller composing at least two secondary data fields for recording in the unused share of the predetermined portion wherein at least one of the secondary data fields contains less than all of the metadata elements associated with an image, where it is determined that there is insufficient recording capacity;
    with the controller further being adapted to cause the writing head to record the composed primary and secondary metadata elements on the photographic filmstrip.

29. The camera of claim 28 wherein the controller generates an indication that at least one of the metadata fields contains less than all of the metadata elements and causes the writing head to record the indication on the filmstrip.

30. The camera of claim 29 wherein the indication identifies metadata fields having less than all of the metadata elements.

31. The camera of claim 28 wherein each of the secondary metadata fields comprises a valid APS metadata field.

32. The camera of claim 31 wherein the controller generates an indication that at least one of the metadata fields contains less than all of the metadata elements and causes the writing head to record the indication on the filmstrip.

33. The camera of claim 32 wherein the indication identifies metadata fields having less than all of the metadata elements.

34. The camera of claim 28 wherein the metadata elements are prioritized and wherein lower priority metadata elements are omitted from the at least one of the secondary metadata fields containing less than all of the metadata elements associated with an image before higher priority metadata elements are omitted.

35. The camera of claim 34 wherein the controller generates an indication that at least one of the metadata fields contains less than all of the metadata elements and causes the writing head to record the indication on the filmstrip.

36. The camera of claim 35 wherein the indication identifies metadata fields having less than all of the metadata elements.

37. An apparatus for extracting metadata from a photographic filmstrip comprising:

a read head engaging the filmstrip;

a controller operating the read head to read metadata recorded on the filmstrip, wherein the controller is adapted to process each metadata field recorded on the filmstrip and to extract metadata from the metadata field having the greatest number of metadata elements.

38. The apparatus of claim 37 wherein the metadata recorded on the filmstrip includes an indication that at least one of the metadata fields comprises less than all of the metadata associated with an image and wherein the controller examines the metadata to detect said indication, processes first metadata from the metadata field having the greatest number of metadata elements before reading remaining metadata fields.

39. The apparatus of claim 38 wherein the metadata recorded on the filmstrip includes an indication that a specific metadata field comprises less than all of the metadata associated with an image and wherein the controller processes other metadata fields before processing the metadata field having less than all of the metadata associated with the image.

40. The apparatus of claim 37, wherein the metadata recorded on the filmstrip includes an indication that a metadata field comprises all of the metadata associated with an image and wherein the controller processes the metadata field having all of the metadata before processing other metadata fields.

41. A method for recording a set of metadata elements using a predetermined storage capacity of a memory associated with photographic filmstrip, the method comprising the steps of:

recording a primary metadata field including the entire set of data elements using a first share of the predetermined storage capacity;

recording at least two secondary data fields in a second share of the predetermined storage capacity;

wherein at least one of the secondary metadata fields contains less than all of the metadata elements.

42. The method of claim 41 further comprising the step of recording an indication that at least one of the metadata elements contains less than all of the metadata elements.

43. The method of claim 42 wherein the indication identifies metadata fields having less than all of the metadata elements.

44. The method of claim 41 wherein each of the secondary metadata fields comprises a valid APS metadata field.

45. The method of claim 44 further comprising the step of recording an indication that at least one of the metadata fields contains less than all of the metadata elements.

46. The method of claim 45 wherein the indication identifies metadata fields having less than all of the metadata elements.

47. The method of claim 41 wherein the metadata elements are prioritized and wherein lower priority metadata elements are omitted from the at least one of the secondary metadata fields containing less than all of the metadata elements associated with an image before higher priority metadata elements are omitted.

48. The method of claim 47 further comprising the step of recording an indication that at least one of the metadata fields contains less than all of the metadata elements.

49. The method of claim 48 wherein the indication identifies metadata fields having less than all of the metadata elements.

* * * * *